US007711146B2

(12) United States Patent
Tu et al.

(10) Patent No.: US 7,711,146 B2
(45) Date of Patent: May 4, 2010

(54) METHOD AND SYSTEM FOR PERFORMING IMAGE RE-IDENTIFICATION

(75) Inventors: Peter Henry Tu, Niskayuna, NY (US); Thomas Baby Sebastian, Flemington, NJ (US); Jens Rittscher, Ballston Lake, NY (US); Nils Oliver Krahnstoever, Albany, NY (US); Gianfranco Doretto, Albany, NY (US); Xiaoming Liu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 918 days.

(21) Appl. No.: 11/478,049

(22) Filed: Jun. 30, 2006

(65) Prior Publication Data
US 2007/0211938 A1    Sep. 13, 2007

Related U.S. Application Data

(60) Provisional application No. 60/780,820, filed on Mar. 9, 2006.

(51) Int. Cl.
*G06K 9/00* (2006.01)
(52) U.S. Cl. .................. 382/103; 382/107; 348/143; 348/152; 348/161; 348/169; 348/172
(58) Field of Classification Search .................. 382/103, 382/107; 348/143, 152–159, 161, 169–172
See application file for complete search history.

(56) References Cited

U.S. PATENT DOCUMENTS

| 6,535,620 B2* | 3/2003 | Wildes et al. ............... 382/107 |
| 2003/0219146 A1* | 11/2003 | Jepson et al. ............... 382/103 |
| 2004/0228503 A1* | 11/2004 | Cutler ........................ 382/103 |

OTHER PUBLICATIONS

F. Moscheni et al., Spatiotemporal segmentation based on region merging, Sep. 1998, IEEE Trans. Pattern Analysis and Machine Intelligence, vol. 20 No. 9, pp. 897-915.*
Mezaris et al., Video object segmentation using Bayes-based temporal tracking and trajectory-based region merging, 2004, IEEE Trans. on Circuits and Systems for Video Technology, vol. 4, pp. 782-795.*
Javed et al., Tracking across multiple cameras with disjoint views, 2003, IEEE, Proceedings of the Ninth IEEE International Conference on Computer Vision, vol. 2, p. 1-6.*
She, Vehicle tracking using on-line fusion of color and shape features, 2004, IEEE Int. Conf. on Intelligent Transportation Systems, pp. 731-736.*
Song et al.,Unsupervised learning of human motion, 2003, IEEE Trans. Pattern Analysis and Machine Intelligence, vol. 25 7, pp. 814-827.*

(Continued)

*Primary Examiner*—Andrew W Johns
*Assistant Examiner*—Jason Heidemann
(74) *Attorney, Agent, or Firm*—Joseph J. Christian

(57) ABSTRACT

A method for re-identifying an image is provided. The method comprises obtaining a plurality of images and generating a correspondence map between the plurality of images. The method further comprises defining a plurality of region signatures for one or more regions comprising the plurality of images and comparing the plurality of images based on the correspondence map and the plurality of region signatures to perform image re-identification.

32 Claims, 4 Drawing Sheets

OTHER PUBLICATIONS

L. Vincent and P. Soille; "Watersheds in Digital Spaces: An Efficient Algorithm Based on Immersion Simulations"; IEEE Transactions on Pattern Analysis and Machine Intelligence, vol. 13, No. 6, Jun. 1991; pp. 583-598.

Ken Shoemake and Tom Duff; "Matrix Animation and Polar Decomposition"; Proceedings of Graphics interface, pp. 258-264;1992. (7 pages).

Y. Amit and A. Kong; "Graphical Templates for Model Registration"; IEEE Transactions on Pattern Analysis and Machine Intelligence, vol. 18, No. 3, Mar. 1996; pp. 225-236.

David G. Lowe; "Object Recognition from Local Scale-Invariant Features"; Proc. of the International Conference on Computer Vision-vol. 2, 1999. (8Pages).

S. Belongie, J. Malik, and J. Puzicha; "Shape Matching and Object Recognition Using Shape Contexts"; IEEE Transactions on Pattern Analysis and Machine Intelligence, vol. 24, No. 24, Apr. 2002; pp. 509-521.

P.F. Felzenszwalb and D. Huttenlocher; "Efficient Graph-Based Image Segmentation"; International Journal on Computer Vision,vol. 59, No. 2:167-181, 2004. (pp. 26).

A. Senior, R. -L. Hsu, M. A. Mottaleb, and A. K. Jain; Face Detection in Color Images; IEEE Transactions on Pattern Analysis and Machine Intelligence, vol. 24, No. 5, May 2002; pp. 696-706.

Wang et al.; "Silhouette Analysis-Based Gait Recognition for Human Identification"; IEEE Transactions on Pattern Analysis and Machine Intelligence, vol. 25, No. 12, Dec. 2003; pp. 1505-1518.

Josef Sivic and Andrew Zisserman; "Video Google: A Text Retrieval Approach to Object Matching in Videos"; Proceedings of the Ninth IEEE International Conference on Computer Vision (ICCV 2003) 2-Volume Set; pp. 8.

P.F. Felzenszwalb; "Representation and Detection of Deformable Shapes"; IEEE Transactions on Pattern Analysis and Machine Intelligence, 27(2): 208-220, Feb. 2005.

\* cited by examiner

METHOD AND SYSTEM FOR PERFORMING IMAGE RE-IDENTIFICATION

CROSS REFERENCE TO RELATED APPLICATIONS

This application claims priority from provisional patent application Ser. No. 60/780,820, filed Mar. 9, 2006, which is herein incorporated by reference in its entirety.

BACKGROUND

The invention relates generally to image re-identification and more particularly to a technique for performing person re-identification based on the overall appearance of an individual.

A number of applications require the ability to re-identify an individual across multiple disjointed fields of view. Re-identification is the ability to identify a previously observed individual. In many surveillance applications, there is a need to be able to re-identify an individual based on their appearance during that day. Re-identification techniques may also be used in security applications, forensic applications, for the identification of missing people and for robust site wide tracking in crowded environments such as mass transit and airports.

As will be appreciated by those skilled in the art, person re-identification typically involves establishing correspondences between parts of images and generating invariant signatures for comparing the corresponding parts. Several approaches have been proposed where invariant signatures based on a global appearance of an individual are compared. For example, a color histogram of the region below the face, or clothing color descriptors, may serve as a signature for comparison. Re-identification may then be achieved by comparing adjusted color histograms.

In contrast to global appearance-based methods, a number of object recognition techniques such as interest point operators and model fitting have been developed to establish correspondences between objects. These techniques have demonstrated that comparing multiple local signatures can be effective in exploiting spatial correspondences between individuals and achieving robustness regarding local variation in appearance.

It would be desirable to develop a technique to perform person re-identification using model fitting to establish spatial correspondences between individuals. In addition, it would be desirable to develop a technique to perform person re-identification using signatures that are invariant to the dynamic nature of clothing, and changes in illumination conditions, and pose.

BRIEF DESCRIPTION

In one embodiment, a method for re-identifying an image is provided. The method comprises obtaining a plurality of images and generating a correspondence map between the plurality of images. The method further comprises defining a plurality of region signatures for one or more regions comprising the plurality of images and comparing the plurality of images based on the correspondence map and the plurality of region signatures to perform image re-identification.

In a second embodiment, a method for re-identifying an image is provided. The method comprises obtaining a plurality of images and defining a plurality of region signatures for one or more regions comprising the plurality of images. The method then comprises performing a spatiotemporal segmentation of the one or more regions comprising the plurality of images and generating a plurality of spatiotemporally similar regions corresponding to the plurality of images. The method finally comprises comparing the plurality of images, based on the plurality of spatiotemporally similar regions, to perform image re-identification.

In a third embodiment, a system for re-identifying an image is provided. The system comprises a plurality of cameras configured to obtain a plurality of images. The system further comprises a computer configured to process the plurality of images. The computer is configured to generate a correspondence map between the plurality of images, define a plurality of region signatures for one or more regions comprising the plurality of images and compare the plurality of images based on the correspondence map and the plurality of region signatures to perform image re-identification.

These and other features, aspects, and advantages of the invention will become better understood when the following detailed description is read with reference to the accompanying drawings in which like characters represent like parts throughout the drawings.

DRAWINGS

DETAILED DESCRIPTION

Figure 1:
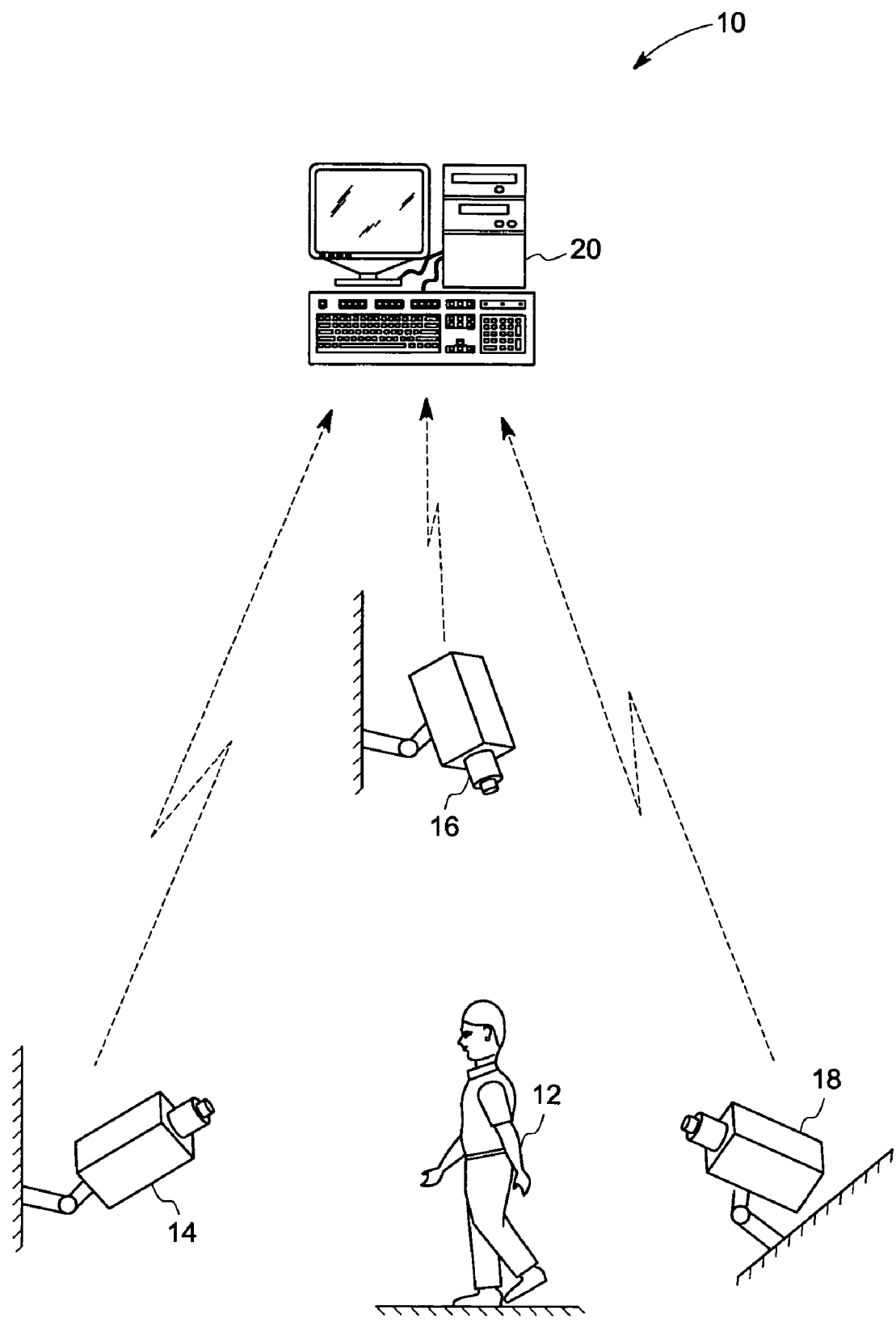
FIG. 1 is a high-level illustration of a system for re-identifying an image in accordance with embodiments of the invention.

FIG. 1 is a high-level illustration of a system for re-identifying an image in accordance with embodiments of the invention. As shown in FIG. 1, the system 10 includes a plurality of cameras, 14, 16 and 18 configured to obtain a plurality of images. In one embodiment, the plurality of images correspond to images of an individual 12 taken across multiple disjointed fields of view, using the plurality of cameras 14, 16 and 18. The system 10 further includes a computer 20 configured to process the plurality of images.

In accordance with one embodiment, processing the plurality of images comprises generating a correspondence map between the plurality of images. In a particular embodiment, generating the correspondence map comprises mapping the plurality of images based on structural information associated with the plurality of images. As used herein, "structural information" refers to different body parts (such as, for example, the head, arms, legs and torso) of an individual and "mapping" the plurality of images based on structural information comprises matching the appearance of the different body parts of an individual in one scene with the body parts of an individual in a second scene. As will be appreciated by those skilled in the art, the relative location of arms, legs and torso of an individual in one scene may vary from another scene. Accordingly, it is desirable to accurately localize the different parts and establish correspondences between the different body parts of an individual in two scenes to facilitate a comparison of the appearance of these body parts.

In a particular embodiment, and as will be described in greater detail below, generating the correspondence map further comprises segmenting the plurality of images using a decomposable triangulated graph technique. A model of the plurality of images to be compared is generated based on the decomposable triangulated graph technique and the generated models are fitted to the plurality of images based on a dynamic programming technique. As will be appreciated by those skilled in the art, a decomposable triangulated graph is used to represent deformable shapes. In a typical implementation, the graphs are a collection of cliques of size three and have a perfect elimination order for their vertices. That is, there exists an elimination order for all vertices such that each eliminated vertex belongs only to one triangle and the decomposable triangulated graph results from eliminating the vertex.

Figure 2:
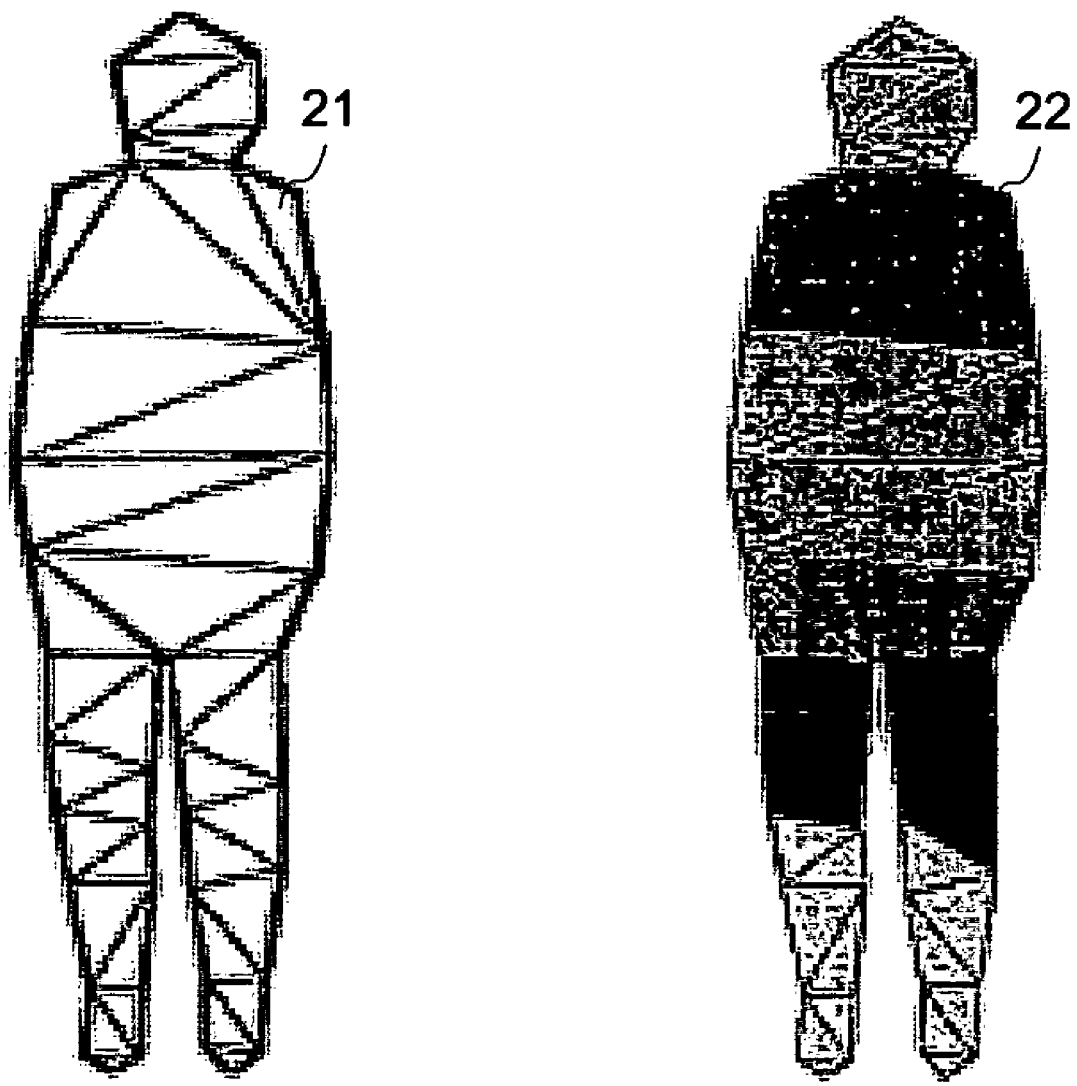
FIG. 2 is an exemplary illustration of a decomposable triangulated graph of a person model generated in accordance with embodiments of the invention.

FIG. 2 is an exemplary illustration of a decomposable triangulated graph of a person model generated in accordance with embodiments of the invention. Reference numeral 21 corresponds to a decomposable triangulated graph used as a person model. Reference numeral 22 corresponds to a partitioned person for generating signatures for comparison. In accordance with a particular embodiment, the decomposable triangulated graph technique uses an energy minimization approach to model and segment people in a scene as will be described in greater detail below.

In accordance with one embodiment, generating a model of the plurality of images to be compared based on a decomposable triangulated graph technique comprises generating a bounding box of a person of interest. In an exemplary implementation, the decomposable triangulated graph T consists of n triangles $T_i$, where $i=1, \ldots n$. An energy function $E(g, I)$ is defined such that when the decomposable triangulated graph T is mapped to the image domain, the consistency of the model with salient image features is maximized, and deformations of the underlying model are minimized. In a particular embodiment, the energy function g is a piecewise affine map, where the deformation of a triangle, $g_i(T_i)$ in the model is an affine transformation. An affine map or affine transformation is deformation of a vector space into another that can be expressed as a linear transformation followed by a translation.

The energy functional $E(g, I)$ to be minimized may be represented as a sum of costs with one set of costs for each triangle in the model. Specifically, $$E(g, I) = \sum_i E_i(g_i, I) \quad (1)$$

$$= \sum_i E_i^{data}(g_i, I) + E_i^{shape}(g_i)$$

where I denotes the features of the underlying image.

The shape cost and the data cost for a triangle in the model are then formulated. The shape cost for each triangle is defined in terms of the polar decomposition of its affine transformation. As will be appreciated by those skilled in the art, for an affine matrix A, the polar decomposition may be represented by equation (2) as shown below:

$$A = \begin{bmatrix} \cos\psi & -\sin\psi \\ \sin\psi & \cos\psi \end{bmatrix} \begin{bmatrix} s_x & s_h \\ s_h & s_y \end{bmatrix} \quad (2)$$

$$= R(\psi)S.$$

where S is the scale-shear matrix and $R(\psi)$ is the closest possible rotation matrix to $A^1$. As will be appreciated by those skilled in the art, the non-translational component of an affine transformation may be decomposed into scaling, shear and rotation components. In matrix form, the rotational component is represented using the rotation matrix, while the scale and shear terms are represented using the scale-shear matrix. The polar decomposition may be derived from the commonly used singular value decomposition of the affine transformation. The shape term may then be defined as follows:

$$E^{shape} = \log\left(\frac{\lambda_1}{\lambda_2}\right)^2 + \log(1 + s_h)^2 \quad (3)$$

where $\lambda_1$ and $\lambda_2$ are the eigen values of the scale-shear matrix S. Referring to equation (3), the first term is the log-anisotropy term and penalizes changes in the aspect ratio (ratio of height to width) while the second term penalizes shear.

Referring to equation (1), the data cost in the energy functional $E(g, I)$ determines salient image features in the model. As will be appreciated by those skilled in the art, the decomposable triangulated graph T includes both boundary edges and interior edges and the data costs are defined only for boundary edges. In particular, the data cost for all the interior edges is zero.

In accordance with one embodiment of the invention, two complementary sets of image features are used to define the data cost in the energy functional $E(g, I)$. Salient edges in the image are detected using Canny's algorithm and a foreground mask is obtained using a spatiotemporal segmentation as will be described in greater detail below. A combination of Canny edges and spatiotemporal foreground masks is then used to compute the data cost.

After the edges are extracted using the Canny's algorithm, a Euclidean distance transform is applied to obtain the edge feature image D. The edge cost measures the distance of the boundary triangle edge from the Canny edges. The average edge feature value along a sampled triangle edge $L=\{(x_i, y_i), i=1, \ldots n\}$ is used as the edge cost. That is, $$E^{edge} = \frac{1}{n}\sum_{i=1}^{n} D(x_i, y_i). \quad (4)$$

The foreground cost measures the consistency of the model with the foreground mask and is defined by the relative number of foreground pixels in a window on either side of the boundary triangle edges. Equation (5) below represents the foreground cost:

$$E^{fg} = 1 - \left|\frac{N_1^{fg}}{N_1} - \frac{N_2^{fg}}{N_2}\right| \quad (5)$$

where $N_1^{fg}$ and $N_1$ are the number of foreground pixels and the total number of pixels on the window on one side. $N_2^{fg}$ and $N_2$ are similarly defined for the other side. It may be noted that this term is small when the boundary edge is along the foreground mask.

The optimal deformation of the model is then computed using a dynamic-programming algorithm. A function "g" that maps the vertices of the model to image locations such that the energy functional in equation (1) is minimized is determined. In accordance with one embodiment, the dynamic programming algorithm performs an exhaustive search for candidate locations to find a global optimum. In a particular embodiment, the candidate locations for the vertices of the model are restricted to the boundaries of the foreground mask and the Canny edges. In a more particular embodiment, a serial dynamic programming algorithm may be used to perform the optimization, since the triangulated model has a perfect elimination order. At each iteration of the dynamic programming algorithm, the perfect elimination order may be used to eliminate one vertex from the model and its optimal location is encoded in terms of its two adjacent vertices. This process is repeated till all vertices are eliminated.

Figure 3:
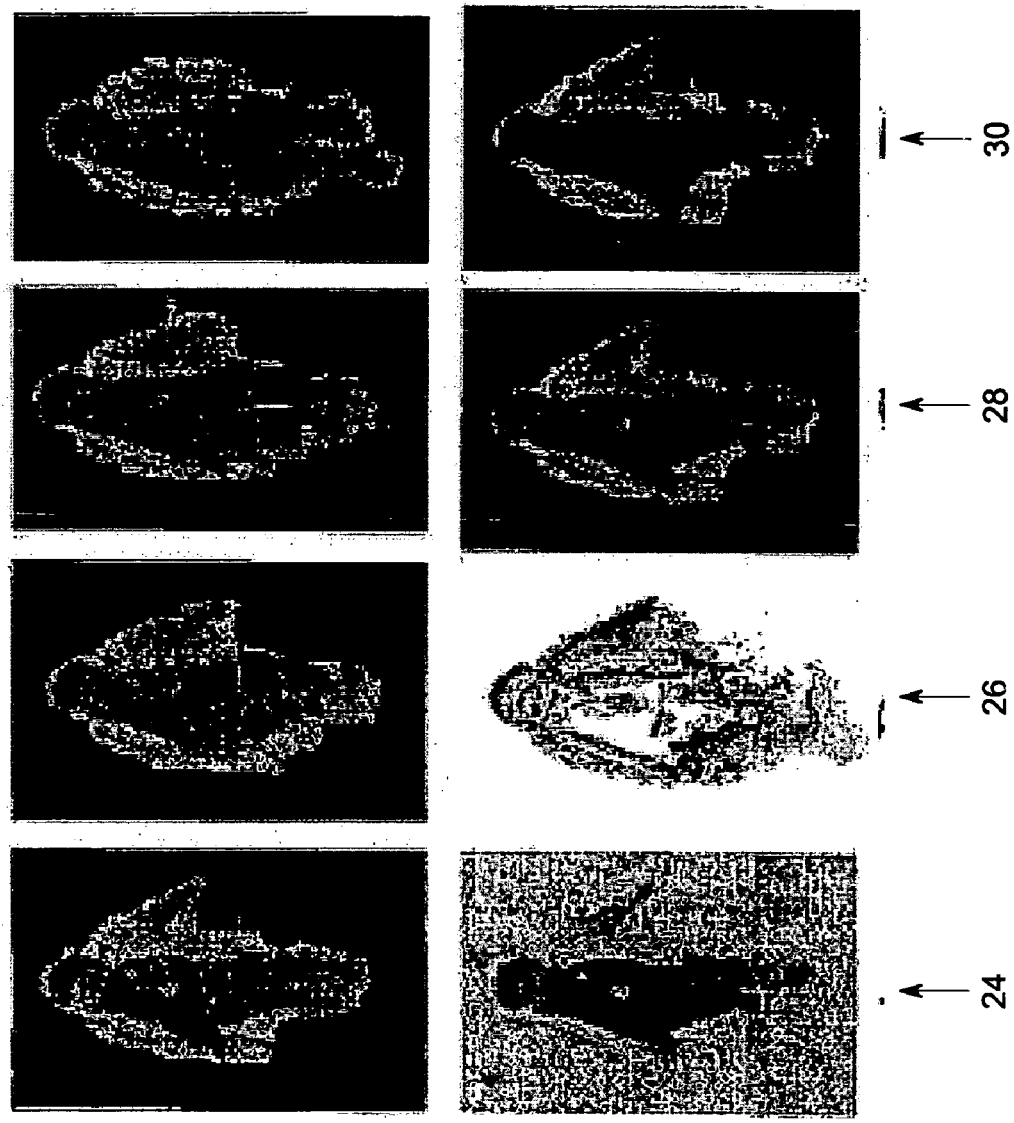
FIG. 3 is an exemplary illustration of fitting a decomposable triangulated model to an individual.

The fitted model may then be used to compute the appearance and shape signature for an individual partitioned into salient body parts. For example, using the fitted model, all the triangles that correspond to the upper torso may be used to extract the appearance and shape signature for the upper torso. FIG. 3 is an exemplary illustration of fitting a decomposable triangulated model to an individual. Reference numeral 24 represents a cropped image, reference numeral 26 represents an edge feature image, reference numeral 28 represents a foreground mask and reference numeral 30 represents the fitted model for two individuals.

In an alternate embodiment of the invention, processing the plurality of images further comprises generating signatures for comparing different regions comprising the plurality of images by combining color and structural information. In one embodiment, a plurality of region signatures are defined based upon a feature vector associated with the one or more regions comprising the plurality of images. In a particular embodiment, the feature vector comprises a histogram of a hue value and a saturation value associated with the one or more regions and a histogram of a plurality of edgels associated with the one or more regions. As will be appreciated by those skilled in the art, the "hue" refers to a particular color within the spectrum, as defined by its dominant wavelength and the "saturation" refers to the intensity of a specific hue. Also, as used herein, "edgels" refer to a set of points fringed together, wherein each point represents a local minima/discontinuity In accordance with the present embodiment, the hue value is defined by equation (6) below:

$$H = \arccos \frac{\log(R) - \log(G)}{\log(R) + \log(G) - 2\log(B)} \quad (6)$$

As mentioned above, the histogram H also reflects the structural qualities of the region. In one embodiment, a histogram of edgels included in a region, i, are used to define the structural qualities of the region. In accordance with the present embodiment, only edgels that are interior to the foreground are considered. Each edgel encodes the dominant local boundary orientation (vertical or horizontal) as well as the ratio between the Red Green Blue (RGB) color components of the two regions on either side of the edgel. These ratios are quantized into four possible values. This results in a seven bit edgel representation. Further, the distance between two feature vectors hi and hj (of N bins) may be determined using intersection histograms known to those skilled in the art, and is defined by equation (7) below:

$$D(h_i, h_j) = 1 - 2 \frac{\sum_{k=1}^{n} \min(h_i(k), h_j(k))}{\sum_{k=1}^{n} (h_i(k) + h_j(k))} \quad (7)$$

In accordance with one embodiment, the edgels are generated based on a spatiotemporal segmentation of one or more regions. The spatiotemporal segmentation takes into consideration that intra fabric boundaries are not stable over time and rejects edge information that is temporally unstable. In a particular embodiment, the spatiotemporal segmentation comprises defining a plurality of region signatures based on a plurality of structural information associated with the one or more regions. As will be appreciated by those skilled in the art, even though many articles of clothing are derived from materials with uniform reflectance properties, a given type of material may appear very different over an image and across time. This is due to the fact that surface normals of loose fitting clothing under articulated motion are highly dynamic. In accordance with the present embodiment, image pixels are segmented and grouped based on the type of fabric. Salient edgels correspond to those pixels that are on the boundaries between two such groupings.

In one embodiment, performing a spatiotemporal segmentation of the one or more regions comprises performing an oversegmentation of one or more foreground regions comprising the plurality of images for a given time window. The oversegmentation is used to determine regions of uniform intensity value for the foreground of an image. As used herein, "oversegmentation" refers to a partitioning of the image into numerous regions, such that each salient region may be split into several sub-regions. In a particular embodiment, the oversegmentation is used to define the set of vertices V for a foreground region. This is performed in two stages. A Sobel operator is first applied to the foreground of each grey level image followed by Gaussian filtering. As used herein, a "Sobel operator" computes the gradient of the image using finite differences. A watershed segmentation algorithm may then be applied to the gradient image to "oversegment" the image.

In a particular embodiment, the oversegmentation comprises partitioning the graph G into a set of clusters, using region grouping. An oversegmentation performed on the foreground regions of each image results in a set of contiguous regions $R=\{r_i^t\}$, where $r_i^t$ is the $i^{th}$ region of image t. The one or more regions may be represented as a graph comprising a set of vertices and a set of edges. A graph $G=\{V, E\}$ is defined for a set of vertices $\{V\}=\{v_i^t\}$ and edges $E=\{e_{i,i'}^{t,t'}\}$, where $v_i^t$ corresponds to a region $r_i^t$ and $e_{i,i'}^{t,t'}$ is an edge connecting two vertices $v_i^t$ and $v_{i'}^{t'}$.

For a given set of vertices $\{V\}$, the edge structure may be defined as comprising a set of spatial edges and a set of temporal edges. If two regions $r_i^t$ and $r_{i'}^t$ share a common boundary, then a spatial edge $e_{i,i'}^{t,t'}$ is formed. A temporal edge $e_{i,i'}^{t,t'}$ is established if for each region $r_i^t$, the region $r_{i'}^{t+1}$ is determined such that $r_{i'}^{t+1}$ has the highest likelihood of corresponding to the same material as $r_i^t$.

The selection of $r_{i'}^{t+1}$ may be determined based on estimates of the motion field. As used herein, a "motion field" refers to the amount of intensity variation that is present at each pixel over time. Accordingly, a frequency image $F_{N,t}(x, y)$ is defined by equation (8) below:

$$F_{N,t}(x, y) = \sum_{k=0}^{N} H(I_t(x, y) - I_{t+k}(x, y)) \quad (8)$$

where $I_t(x, y)$ is the intensity of pixel $(x, y)$ at time t and $H(z) = 1$ if $|z| < \delta$ $H(z) = 0$ otherwise  (9)

for a threshold $\delta$.

As will be appreciated by those skilled in the art, for a given region with uniform intensity and uniform motion, the values of $F_{N,t}(x, y)$ are higher on the side of the region that corresponds to the direction of forward motion. Accordingly, for each overlapping region, $r_{i'}^{t+1}$, the integral of $F_{N,t}(x, y)$ is computed over the intersection of $r_i^t$ and $r_{i'}^{t+1}$. The overlapping region with the highest frequency integral is then selected for a temporal edge.

If two adjacent regions correspond to the same piece of fabric, then for a given time t, they will have a similar appearance, or at some time in the future, they will have a similar appearance. This implies that intra-fabric boundaries are inherently unstable. The edge weight, $w_{i,i'}^{t,t'}$, may be defined as the cost of grouping two regions together as shown by equation (10) below:

$$w_{i,i'}^{t,t} = |M(i, t) - M(i', t)|$$

$$w_{i,i'}^{t,t+1} = \frac{1}{3}|M(i, t) - M(i', t+1)| \quad (10)$$

where $M(i,t)$ is the median intensity value for a region $r_i^t$.

It may be noted that a temporal edge enables for greater variation in appearance. Accordingly, if there is a low cost path connecting two vertices through space, time or a combination of both, then the two associated regions may be grouped.

Once the spatiotemporal graph G is generated for a specified number of consecutive frames, a graph-partitioning algorithm may be used to group spatiotemporally similar regions. In a particular embodiment, the graph-partitioning algorithm is based on a search for clusters with low cost spatiotemporal minimal spanning trees.

In a more particular embodiment, the graph partitioning algorithm merges connected clusters whenever the distance between them is greater than the internal variation of each of the individual clusters. In an exemplary implementation, each cluster C may be represented by a minimum spanning tree $E^c$ passing through all its vertices $V^c$. The maximum edge weight of the minimum spanning tree is used to define the internal variation of the cluster C as defined by equation (11) below:

$$I(C) = \max(\omega_{i,i'}^{t,t'}) s.t. e_{i,i'}^{t,t'} \in E^c \quad (11)$$

The inter-cluster distance between two clusters, $C_m$ and $C_n$, $D(C_m, C_n)$ is defined as the lowest edge weight between the two clusters. That is, $$D(C_m, C_n) = \min(\omega_{i,i'}^{t,t'}) s.t. v_i^t \in V^{C_m}, v_{i'}^{t'} \in V^{C_n}, e_{i,i'}^{t,t'} \in E. \quad (12)$$

Two clusters $C_m$ and $C_n$ may be merged if the inter-cluster distance is small when compared to the internal variation of the individual clusters. Specifically, two clusters $C_m$ and $C_n$ may be merged if $$D(C_m, C_n) \leq MI(C_m, C_n) \quad (13)$$

where $$MI(C_m, C_n) = \min(I(C_m) + k/|C_m|, I(C_n) + k/|C_n|). \quad (14)$$

The factor $k/|C|$ is based on the size of the cluster and is used to determine the formation of larger clusters.

In one embodiment, a greedy algorithm may be used to obtain the graph segmentation that satisfies the conditions in equations (13) and (14). All edges in the spatiotemporal graph are sorted according to non-decreasing edge weights and are then processed in that order. For example, if there exists an edge $e_{i,i'}^{t,t'}$ between two separate clusters $C_m$ and $C_n$ and if the weight of the edge, $w_{i,i'}^{t,t'} \leq MI(C_m, C_n)$, then $C_m$ and $C_n$ are merged and the edge $e_{i,i'}^{t,t'}$ is added to the minimum spanning tree of the combined cluster. This step is repeated until all the edges have been processed. It may be appreciated that the segmentation produced by the above algorithm is optimal in that the maximum edge weight for the minimum spanning tree for each cluster is smaller than the weights of all edges to each of their neighboring clusters.

Figure 4:
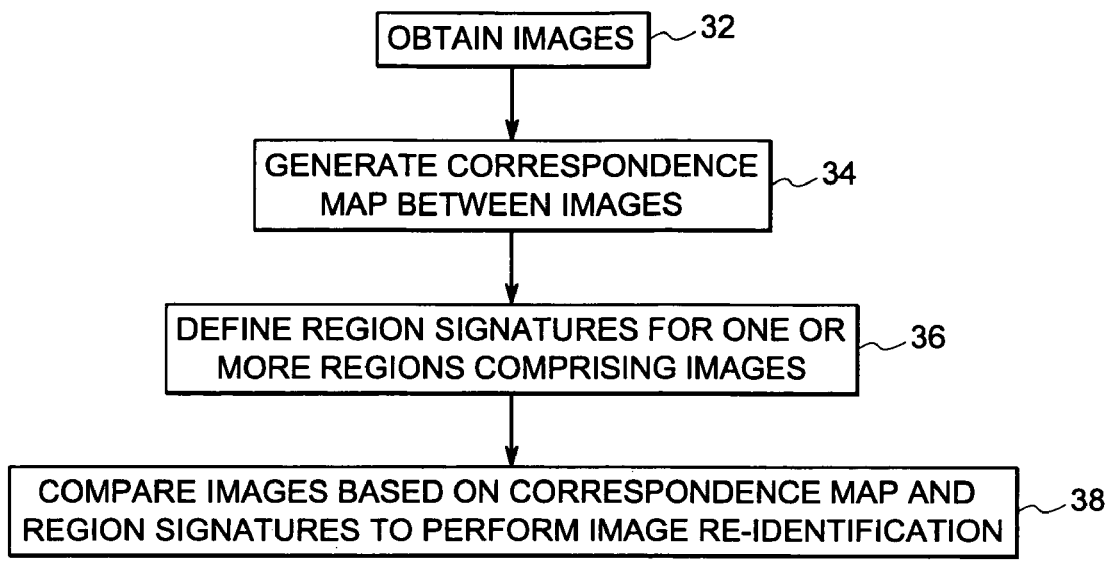
FIG. 4 illustrates a process for re-identifying an image in accordance with embodiments of the invention.

FIG. 4 illustrates a process for re-identifying an image in accordance with embodiments of the invention. In step 32, a plurality of images are obtained. As mentioned above, the plurality of images correspond to images of an individual 12, taken across multiple disjointed fields of view, using a plurality of cameras 14, 16 and 18 (shown in FIG. 1). In step 34, a correspondence map between the plurality of images is generated. As mentioned above, generating the correspondence map comprises mapping the plurality of images based on structural information associated with the plurality of images. In step 36, a plurality of region signatures for one or more regions comprising the plurality of images is defined. As mentioned above, the plurality of region signatures are defined based upon a feature vector associated with the one or more regions comprising the plurality of images. In step 38, the plurality of images are compared based on the correspondence map and the plurality of region signatures to perform image re-identification.

Figure 5:
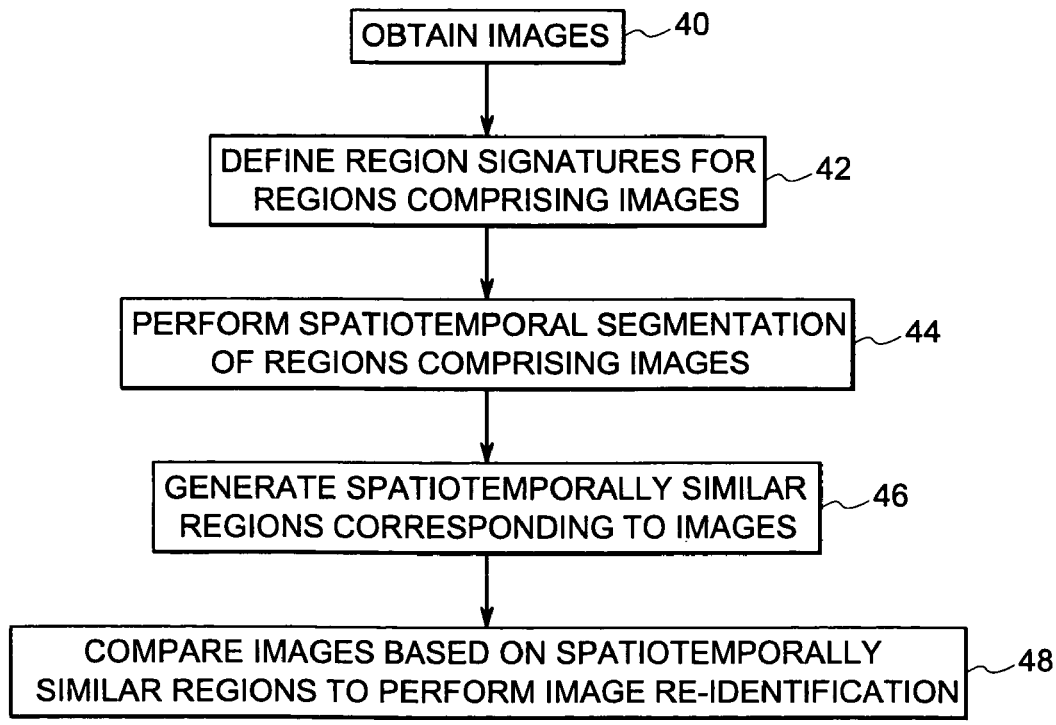
FIG. 5 illustrates a process for generating region signatures in accordance with embodiments of the invention.

FIG. 5 illustrates a process for generating region signatures in accordance with embodiments of the invention. In step 40, a plurality of images are obtained. In step 42, a plurality of region signatures for one or more regions comprising the plurality of images are defined. In one embodiment, the plurality of region signatures are defined based upon a feature vector associated with the one or more regions comprising the plurality of images. In a particular embodiment, and as mentioned above, the feature vector comprises a histogram of a hue value and a saturation value associated with the one or more regions and a histogram of a plurality of edgels associated with the one or more regions.

In step 44, a spatiotemporal segmentation of the one or more regions comprising the plurality of images is performed. In one embodiment, the spatiotemporal segmentation comprises defining a plurality of region signatures based on a plurality of structural information associated with the one or more regions. In a particular embodiment, and as mentioned above, performing a spatiotemporal segmentation of the one or more regions comprises performing an oversegmentation of one or more foreground regions comprising the plurality of images.

In step 46, a plurality of spatiotemporally similar regions corresponding to the plurality of images are generated using a graph partitioning algorithm.

In step 48, the plurality of images are compared based on the plurality of spatiotemporally similar regions to perform image re-identification. In a particular embodiment, comparing the images further comprises generating a correspondence map between the plurality of images based on structural information associated with the plurality of images. As mentioned above, generating a correspondence map comprises segmenting the plurality of images to be compared using a decomposable triangulated graph technique, generating a model of the plurality of images based on the decomposable triangulated graph technique and fitting the generated models to the plurality of images, based on a dynamic programming technique.

Embodiments of the present invention have several applications such as, for example, in a standard surveillance operation where multiple images of an individual need to be captured over a short period of time from a camera. In an exemplary implementation of embodiments of the present invention, a number of individuals entering a corporate campus were recorded using three different cameras with disjoint views. Three to four key frames were selected for each person from each camera view. The images were stored in a database and indexed according to a person identification number, a key frame number and a particular camera view. Each image was compared against the set of images. For each person/camera combination, the maximum ranking true match for all it's key frames was determined, and was used to evaluate algorithm performance.

The disclosed embodiments have several advantages including the ability to perform person re-identification based on the overall appearance of an individual as opposed to passive biometrics such as face and gait. The disclosed technique for performing image re-identification establishes correspondences between image parts and generates signatures that are invariant to variations in illumination and pose and to the dynamic appearance of loose or wrinkled clothing. The invariant signatures are generated by combining normalized color and salient edgel histograms. The disclosed spatiotemporal segmentation algorithm generates salient edgels that are robust to changes in appearance of clothing. Further, the disclosed model-based approach fits an articulated model to each individual to establish correspondences between parts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for re-identifying an image, comprising:
obtaining a plurality of images using a plurality of cameras;
generating with a computer a correspondence map between the plurality of images using structural information;
defining with the computer a plurality of region signatures for one or more regions comprising the plurality of images, wherein the one or more regions are represented as a graph comprising a set of vertices, a set of spatial edges and a set of temporal edges; and
comparing with the computer the plurality of images based on the correspondence map and the plurality of region signatures to perform image re-identification.

2. The method of claim 1, wherein the plurality of images correspond to images of individuals taken across multiple disjointed fields of view.

3. The method of claim 1, wherein said generating a correspondence map comprises mapping the plurality of images based on structural information associated with the plurality of images.

4. The method of claim 3, wherein said generating a correspondence map further comprises segmenting the plurality of images based on a decomposable triangulated graph technique.

5. The method of claim 4, comprising generating a model of the plurality of images based on the decomposable triangulated graph technique.

6. The method of claim 5, comprising fitting the generated models to the plurality of images based on a dynamic programming technique.

7. The method of claim 1, wherein said defining a plurality of region signatures comprises generating a feature vector for the one or more regions comprising the plurality of images.

8. The method of claim 7, wherein the feature vector comprises a histogram of a hue value and a saturation value associated with the one or more regions and a histogram of a plurality of edgels associated with the one or more regions.

9. The method of claim 1, wherein said defining a plurality of region signatures further comprises performing a spatiotemporal segmentation of the one or more regions comprising the plurality of images.

10. The method of claim 9, wherein said performing a spatiotemporal segmentation of the one or more regions comprises defining the plurality of region signatures based on a plurality of structural information associated with the one or more regions.

11. The method of claim 10, wherein said performing a spatiotemporal segmentation comprises generating a plurality of spatiotemporally similar regions corresponding to the plurality of images based on a graph partitioning algorithm and comparing the plurality of images based on the plurality of spatiotemporally similar regions.

12. A method for re-identifying an image, comprising:
obtaining a plurality of images using a plurality of cameras;
defining with a computer a plurality of region signatures for one or more regions comprising the plurality of images, wherein the one or more regions are represented as a graph comprising a set of vertices, a set of spatial edges and a set of temporal edges;
performing with the computer a spatiotemporal segmentation of the one or more regions comprising the plurality of images;
generating with the computer a plurality of spatiotemporally similar regions corresponding to the plurality of images; and
comparing with the computer the plurality of images, based on the plurality of spatiotemporally similar regions, to perform image re-identification.

13. The method of claim 12, wherein said defining a plurality of region signatures comprises generating a feature vector for the one or more regions comprising the plurality of images.

14. The method of claim 13, wherein the feature vector comprises a histogram of a hue value and a saturation value associated with the one or more regions and a histogram of a plurality of edgels associated with the one or more regions.

15. The method of claim 12, wherein said performing a spatiotemporal segmentation of the one or more regions comprises defining the plurality of region signatures based on a plurality of structural information associated with the one or more regions.

16. The method of claim 15, wherein said performing a spatiotemporal segmentation of the one or more regions comprises performing an oversegmentation of one or more foreground regions comprising the plurality of images.

17. The method of claim 12, wherein the one or more regions are represented as a graph comprising a set of vertices and a set of edges.

18. The method of claim 17, wherein the set of edges comprise a set of spatial edges and a set of temporal edges.

19. The method of claim 12, wherein said generating a plurality of spatiotemporally similar regions corresponding to the plurality of images comprises using a graph partitioning algorithm.

20. The method of claim 12, wherein said comparing the plurality of images further comprises generating a correspondence map between the plurality of images based on structural information associated with the plurality of images.

21. The method of claim 20, wherein said generating a correspondence map comprises segmenting the plurality of images to be compared using a decomposable triangulated graph technique.

22. The method of claim 21, comprising generating a model of the plurality of images, based on the decomposable triangulated graph technique.

23. The method of claim 22, comprising fitting the generated models, to the plurality of images, based on a dynamic programming technique.

24. A system for re-identifying an image, comprising:
 a plurality of cameras configured to obtain a plurality of images; and
 a computer configured to process the plurality of images, wherein the computer:
  generates a correspondence map between the plurality of images using structural information;
  defines a plurality of region signatures for one or more regions comprising the plurality of images, wherein the one or more regions are represented as a graph comprising a set of vertices, a set of spatial edges and a set of temporal edges; and
  compares the plurality of images based on the correspondence map and the plurality of region signatures to perform image re-identification.

25. The system of claim 24, wherein the plurality of images correspond to images of individuals taken across multiple disjoint fields of view.

26. The system of claim 24, wherein said generating a correspondence map comprises mapping the plurality of images based on structural information associated with the plurality of images.

27. The system of claim 26, wherein the computer is configured to:
 segment the plurality of images based on a decomposable triangulated graph technique;
 generate a model of the plurality of images to be compared, based on the decomposable triangulated graph technique; and
 fit the generated models, to the plurality of images based on a dynamic programming technique.

28. The system of claim 24, wherein the computer is configured to define the plurality of region signatures based on a feature vector associated with the one or more regions comprising the plurality of images.

29. The system of claim 28, wherein the feature vector comprises a histogram of a hue value and a saturation value associated with the one or more regions and a histogram of a plurality of edgels associated with the one or more regions.

30. The system of claim 24, wherein the computer is configured to define the plurality of region signatures based on a spatiotemporal segmentation of the one or more regions comprising the plurality of images.

31. The system of claim 30, wherein the computer is configured to perform the spatiotemporal segmentation of the one or more regions by defining the plurality of region signatures based on a plurality of structural edgel information associated with the one or more regions.

32. The system of claim 31, wherein the computer is configured to generate a plurality of spatiotemporally similar regions corresponding to the plurality of images based on a graph partitioning algorithm and compare the plurality of images based on the plurality of spatiotemporally similar regions.

* * * * *